United States Patent

Ishii

[11] Patent Number: 5,136,379
[45] Date of Patent: Aug. 4, 1992

[54] VIDEO SIGNAL PROCESSING DEVICE CAPABLE OF VERTICAL BLOCKING

[75] Inventor: Yoshiki Ishii, Yokohama, Japan

[73] Assignee: Canon Kabushiki Kaisha, Tokyo, Japan

[21] Appl. No.: 626,220

[22] Filed: Dec. 12, 1990

[30] Foreign Application Priority Data

Dec. 14, 1989 [JP] Japan .................................. 1-324586

[51] Int. Cl.$^5$ .............................................. H04N 7/13
[52] U.S. Cl. ..................................... 358/138; 358/133
[58] Field of Search ...................... 358/21 R, 133, 135, 358/136, 138

[56] References Cited

U.S. PATENT DOCUMENTS

| 4,903,124 | 2/1990 | Hoshi et al. | 358/133 |
| 4,907,081 | 3/1990 | Okamura | 358/138 |

Primary Examiner—Tommy P. Chin
Attorney, Agent, or Firm—Fitzpatrick, Cella, Harper & Scinto

[57] ABSTRACT

A video signal processing device has a sampling unit for sampling a luminance signal and two types of color difference signals respectively contained in a video signal. The sampling unit being samples the luminance and the color difference signals such that (1)

the ratio of the total sampling number of the luminance signal to that of each of the two types of color difference signals is m:n (where m and n are positive integers), (2)

the ratio of the sampling number of the luminance signal to that of each of the two types of color difference signals is N:1 (where N is an even number equal to 2 or more), for each line extending in the scan direction of the video signal, (3)

the ratio of the total sampling frequency of the luminance signal to that of each of the two types of color difference signals is 1:(nN/m), for a second direction intersecting the first direction, and (4)

the ratio of the sampling number of the luminance signal to those of the two types of color difference signals is one of (m/n)): 1:1, (m/n) : 2:0, or (m/n): 0:2, for each line extending in the second direction.

As a result, irrespective of the ratio of the total sampling number of the luminance signal to the total sampling number of each of the two types of color difference signals, signals the luminance signal and the two types of color difference signals can be coded by using correlation of the video signal in the second direction.

20 Claims, 12 Drawing Sheets

VIDEO SIGNAL PROCESSING DEVICE CAPABLE OF VERTICAL BLOCKING

BACKGROUND OF THE INVENTION

1. Field of the Invention

The present invention relates to a video signal processing device, and more particularly to a device for coding a luminance signal and color signals contained in a color video signal.

2. Related Background Art

Video signals such as television signals are now processed as digital signals in many cases. A digital video signal is represented by three primary color signals, typically R, G and B, or a luminance signal and two color difference signals. It is known that the visual sense of human eyes has a lower sensitivity to color change than to luminance change. Therefore, even if the sampling frequency of the color difference signals is made low to reduce the data amount, images can be transmitted without making them visually poor.

In transmitting (which term is to be taken through this specification and claims as including recording and reproducing) such video signals, image data is generally divided into blocks, a transmission error being corrected on a block unit basis, and the transmission error being prevented from propagating to another block. If each block is arranged to contain the luminance signal and color difference signal for the same number of pixels, a color image can be reproduced from only one block containing the same number of pixels of the luminance signal and color signal.

For example, if one data block is set to have an integer multiple Nx . . . ) or sub-multiple (1/nx . . . ) of a horizontal line or lines by setting the sampling point number ratio of each horizontal (H) direction line (each horizontal line) as Y : C1 : C2 = 2 : 1 : 1, and the vertical direction total sampling point number (horizontal line number) ratio as Y : C1 : C2 = 1 : 1 : 1, wherein Y represents the luminance signal (signal Y), and C1 and C2 represent two types of color difference signals (signal C), then it is possible for each data block to contain the same number of pixels of luminance data and color difference data, as shown in FIG. 1A. Furthermore, in the case where signals C1 and C2 are line sequentially transmitted by means of color difference line sequential processing, if the number of horizontal lines for use in sampling signal C1 or C2 is made the same as that of horizontal lines of signal Y, then it is possible for each data block to contain a combination of signal Y and signal C1, and signal Y and signal C2.

The above-described conventional blocking method is effective for horizontal line direction blocking. Vertical line direction blocking has been required recently because of compression coding and other signal processings. The above conventional method is not suitable for such vertical line direction blocking. Specifically, if the same horizontal sampling point number for Y and C (C1 and/or C2) cannot be obtained from any combination of C1 and C2 as is the case where the total sampling point ratio thereof is set as 3 : 1 for example, the vertical line number (horizontal direction total sampling point) becomes different between signal Y and signal C. Therefore, it is not possible for one data block to contain the same number of pixels of signals Y and C.

SUMMARY OF THE INVENTION

Under such circumstances, it is an object of the present invention to solve the above-described problems.

It is another object of the present invention to provide a video signal processing device capable of blocking a color video signal in the vertical line direction.

With the above objects in view, according to one aspect of this invention, there is provided a video signal processing device, comprising:

(a) sampling means for sampling a luminance signal and two types of color difference signals respectively contained in a video signal, the sampling means being constructed such that, the ratio of a total sampling number of the luminance signal to a total sampling number of each of the two types of color difference signals is m : n (where m and n are positive integers), the ratio of sampling number of the luminance signal to a sampling number of each of the two types of color difference signals is N : 1 (where N is an even number equal to 2 or more), for each line extending in a first direction which is the scan direction of the video signal, the ratio of a total sampling frequency of the luminance signal to a total sampling frequency of each of the two types of color difference signals is 1 : (nN/m), for a second direction intersecting with the first direction, and the ratio of a sampling number of the luminance signal to a sampling numbers of the two types of color difference signals is one of (m/n): 1 : 1, (m/n) : 2 : 0, and (m/n): 0 : 2, for each line extending in the second direction; and (b) coding means for coding samples of the luminance signal and the two types of color difference signals sampled by the sampling means.

It is a further object of the present invention to provide a video signal processing device capable of effectively coding a color video signal which uses correlation of images in the vertical direction.

With the above object in view, according to another aspect of the present invention, there is provided a video signal processing device, comprising:

(a) sampling means for sampling a luminance signal and two types of color difference signals respectively contained in a video signal, the sampling means being constructed such that, the ratio of a total sampling number of the luminance signal to a total sampling number of each of the two types of color difference signals is m : n (where m and n are positive integers); and (b) coding means for coding samples of the luminance signal and the two types of color difference signals sampled by the sampling means, the coding by the coding means is executed on a block unit basis, the block containing one line extending in a second direction intersecting a first direction which is the scan direction of the video signal, or containing a sub-multiple of each of several lines extending in the second direction, wherein the ratio of a sampling number of the luminance signal to a sampling numbers of the two types of color difference signals is one of (m/n) : 1 : 1, (m/N) :2 : 0, and (m/n) : 0 : 2, for each of the blocks.

The other objects and advantages of this invention will become apparent from the following detailed description of the embodiments of this invention when read in conjunction with the accompanying drawings.

DETAILED DESCRIPTION OF PREFERRED EMBODIMENTS

Embodiments of this invention will be described with reference to the accompanying drawings.

Figure 1A:
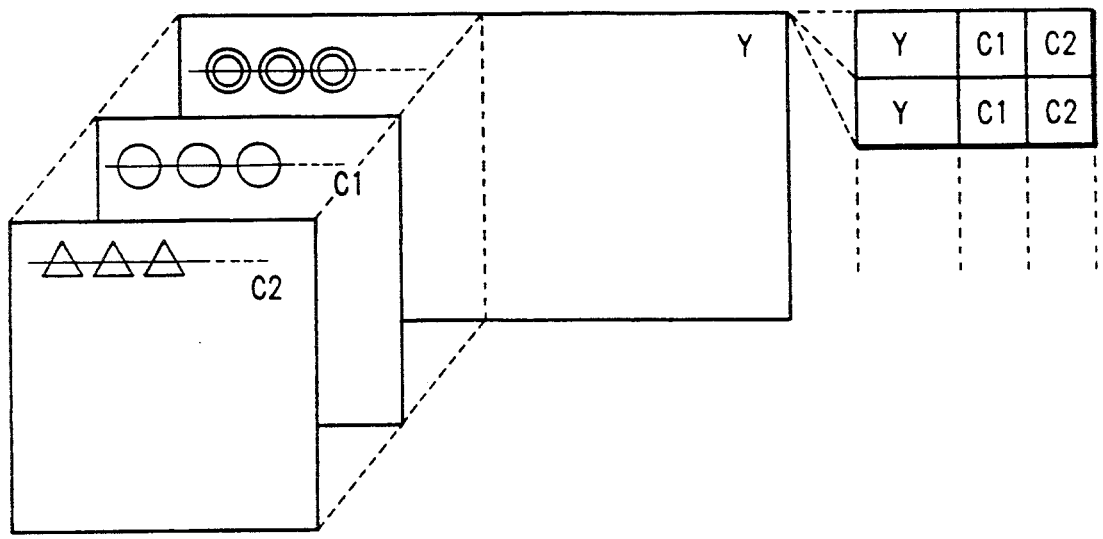
FIGS. 1A and 1B illustrate a conventional method of blocking a luminance signal and color signals in the horizontal line direction.
Figure 1B:
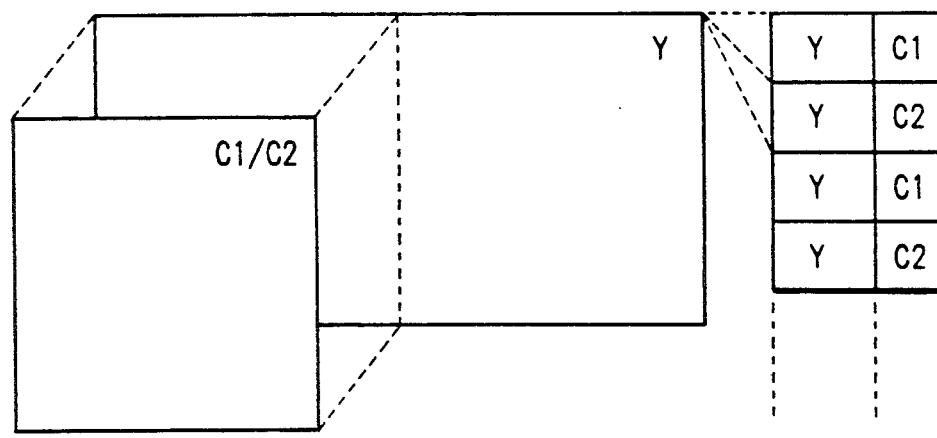
Figure 2A:
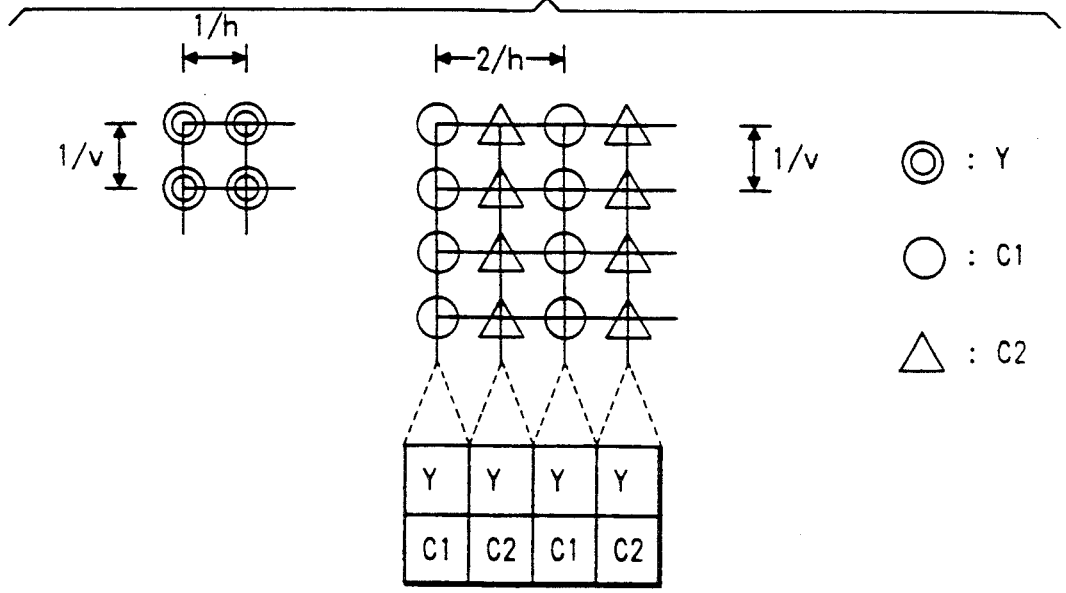
FIGS 2A to 2C show a first example of sampling patterns of a luminance signal and color signals according to the present invention.
Figure 2B:
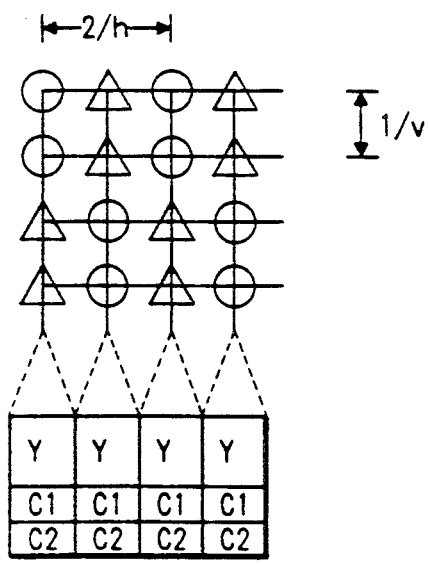
Figure 2C:
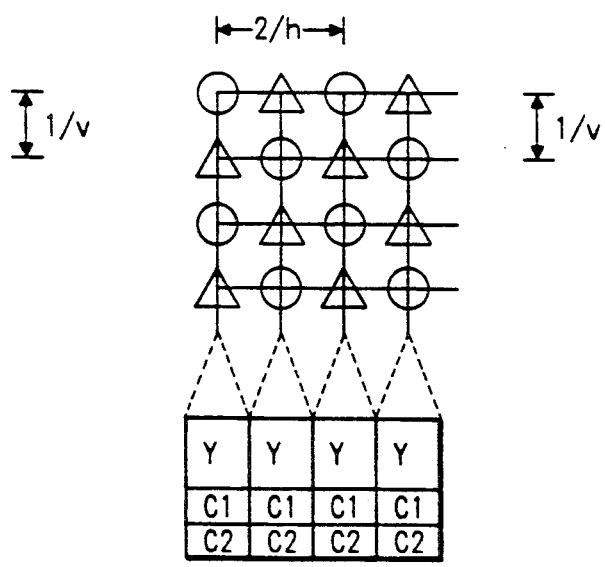

FIGS. 2A to 2C show a first embodiment of vertical direction Y-C line blocking according to the present invention. In the accompanying drawings, a double circle symbol represents a sampling point of signal Y on each of two frames, a circle symbol represents a sampling point of signal C1 on each frame, and a triangle symbol represents a sampling point of signal C2 on each frame. FIGS. 2A, 2B and 2C illustrate examples of vertical Y-C line blocks having a total sampling point number ratio $Y : C1 : C2 = m : n$ (where m, n are positive integers, specifically) where $m=2$ and $n=1$. Representing the horizontal direction sampling frequency of signal Y of each of the horizontal direction lines ("horizontal line") as h, the vertical direction total sampling frequency of signal Y as v, and the horizontal direction sampling frequency of each signal C of each horizontal line as $H=h/N$ (n being an even number equal to 2 or larger), then the vertical direction total sampling frequency of each signal C is represented by $V=v \times N/2$. The number of vertical direction lines (vertical lines) of signal Y is the same as the number of vertical lines of one of signals C, and the sampling point number ratio of each vertical line is $Y : C1 : C2 = m/n : 1 : 1 = 2 : 1 : 1$ (2 : 2 : 0, or 2 : 0 : 2).

FIG. 2A illustrates an example of each vertical line block wherein $N=2$, and signal C is sampled at $H=h/2$ and $V=v$ with the sampling point ratio of $Y : C1 : C2 = 2 : 2 : 0$ and $2 : 0 : 2$ for each vertical line. The blocks shown below in FIG. 2A represent the sampling point number ratio of each vertical line (block). As shown in FIG. 2A, the sampling point number ratio of signal Y and signal C of each vertical line becomes constant although it is different for each horizontal line, so that each vertical line can constitute one block (Y-C line block). Vertical lines may be grouped into Y-C line blocks each constructed of an integer division of vertical lines.

FIG. 2B illustrates an example wherein $N=2$, and signal C is line-offset-subsampled with the sampling point number ratio of $Y : C1 : C2 = 2 : 1 : 1$. In this example, signal C may be sampled at the sampling frequency h for each horizontal line, and thereafter sampling points are thinned by ½ by the line-offset-subsampling, with the same object of this invention being achieved.

FIG. 2C illustrates an example wherein field-offset-subsampling is used instead of line-offset-subsampling in FIG. 2B. Similar to the example of FIG. 2A, for both the examples of FIGS. 2B and 2C, the sampling point number ratio of signal Y and signal C becomes constant for each vertical line to realize a Y-C line block. Furthermore, with the offset-subsampling, the resolution of signal C in the vertical direction can be made higher than that of the example of FIG. 2A.

Figure 3A:
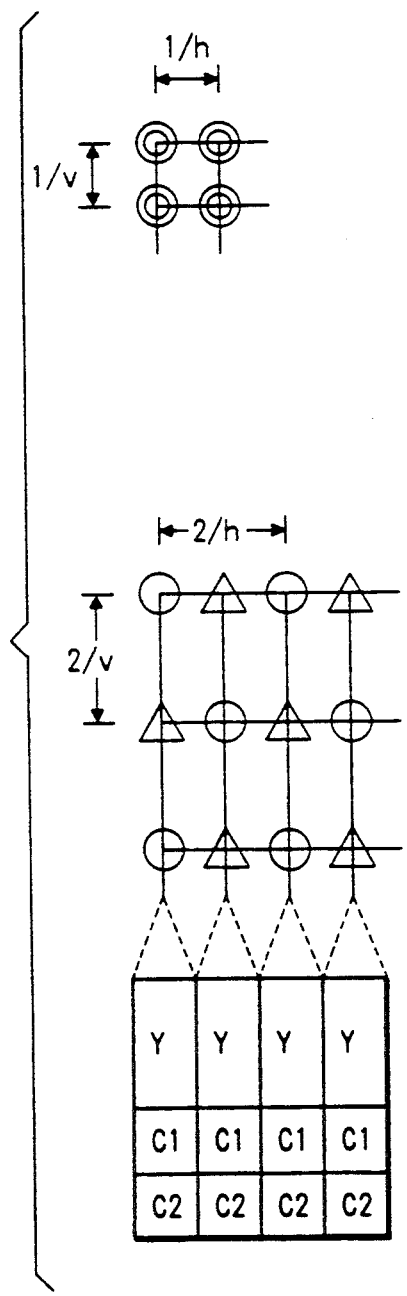
FIGS. 3A and 3B show a second example of sampling patterns.
Figure 3B:
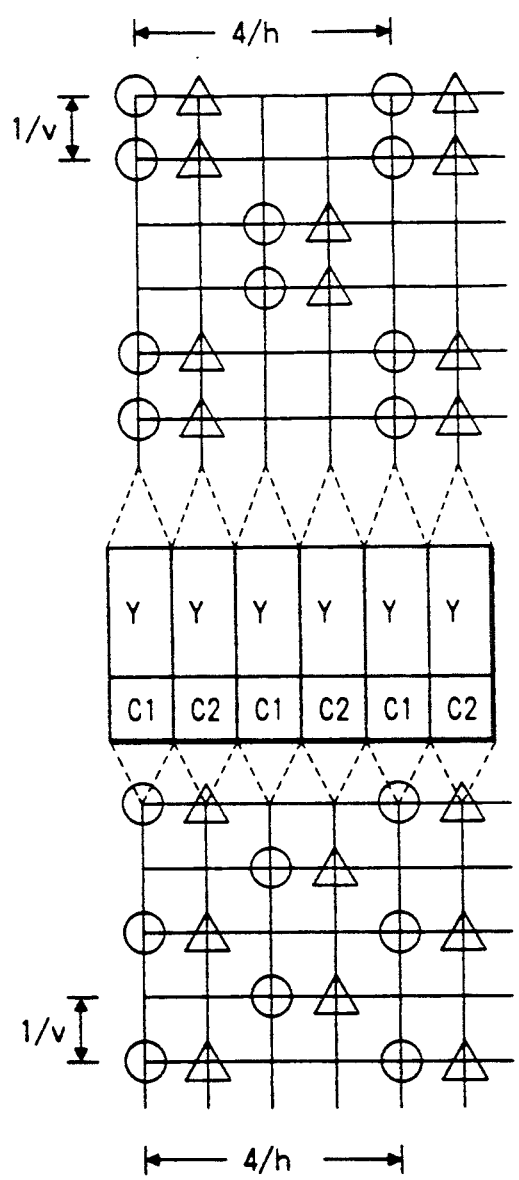

FIGS. 3A and 3B illustrate the third embodiment with the total sampling point number ratio of $Y : C1 : C2 = 4 : 1 : 1$. FIG. 3A illustrates an example wherein $N=2, m : n = 4 : 1, H=h/2, V=v/2$, and field-offset-subsampling is used with the sampling point number ratio of $Y : C1 : C2 = 4 : 1 : 1$ for each vertical line. FIG. 3B illustrates examples wherein $N=4, H=h/4, V=v$, and line-offset-subsampling and field-offset-subsampling are used with the sampling point number ratio of $Y : C1 : C2 = 4 : 2 : 0$ or $4 : 0 : 2$. As seen from FIGS. 3A and 3B, also in these examples, the sampling point number ratio of signal Y and signal C of each vertical line becomes constant although it is different for each horizontal line, so that each vertical line can constitute one block (Y-C line block).

Figure 4:
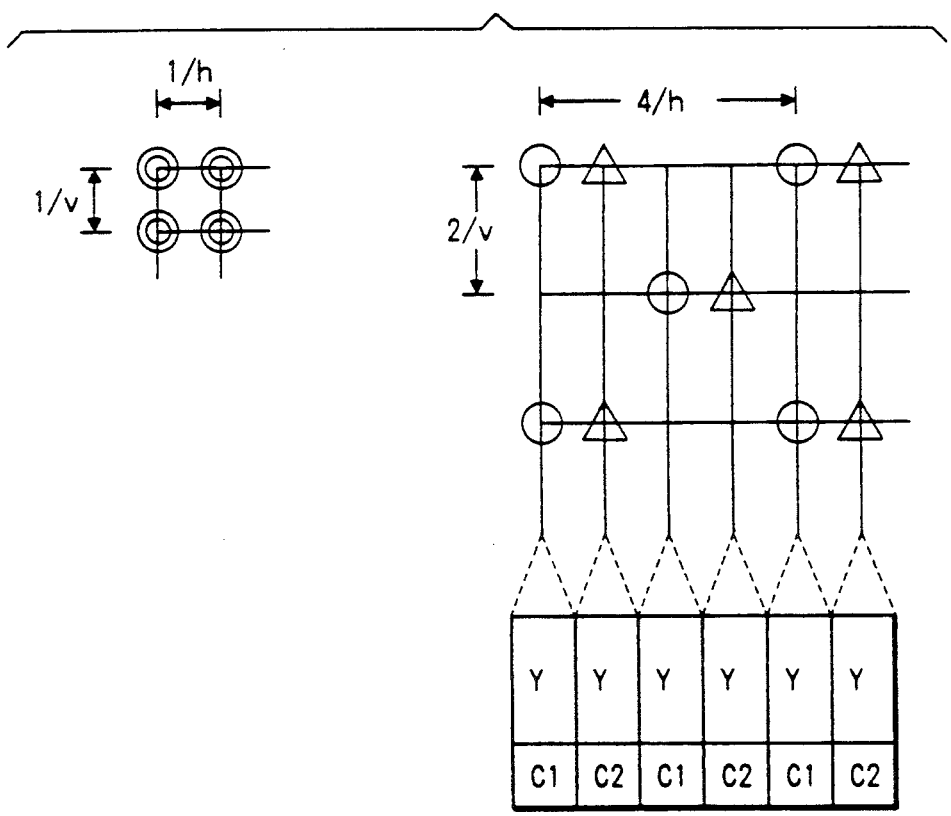
FIG. 4 shows a third example of a sampling pattern.

FIG. 4 illustrates the third embodiment with the total sampling point number ratio $Y : C1 : C2 = 8 : 1 : 1$. In this example, $N=4, H=h/4, V=v/2$, and offset-subsampling is used with the sample point number ratio $Y : C1 : C2 = 8 : 2 : 0$ or $8 : 0 : 2$ for each vertical line.

Figure 5:
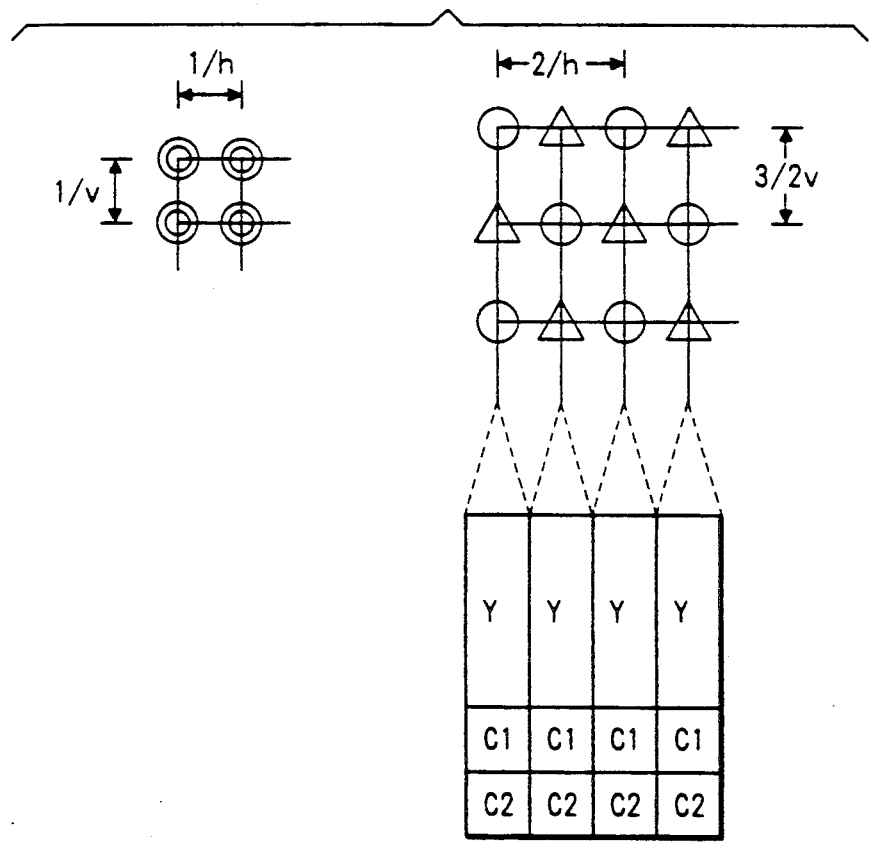
FIG. 5 shows a fourth example of a sample pattern.

FIG. 5 illustrates the fourth embodiment with the total sampling point number ratio $Y : C1 : C2 = 1 : 1 : 1$. In this example, $N=2, H=h/2, V=2v/3$, and offset-subsampling is used with the sample point number ratio $Y : C1 : C2 = 3 : 1 : 1$. The vertical direction total sampling frequency $V=2v/3$ can be realized by first sampling at frequency v and then resampling through vertical ⅔ filtering. This processing may be executed at the time of the prefiltering of offset-subsampling.

Figure 6A:
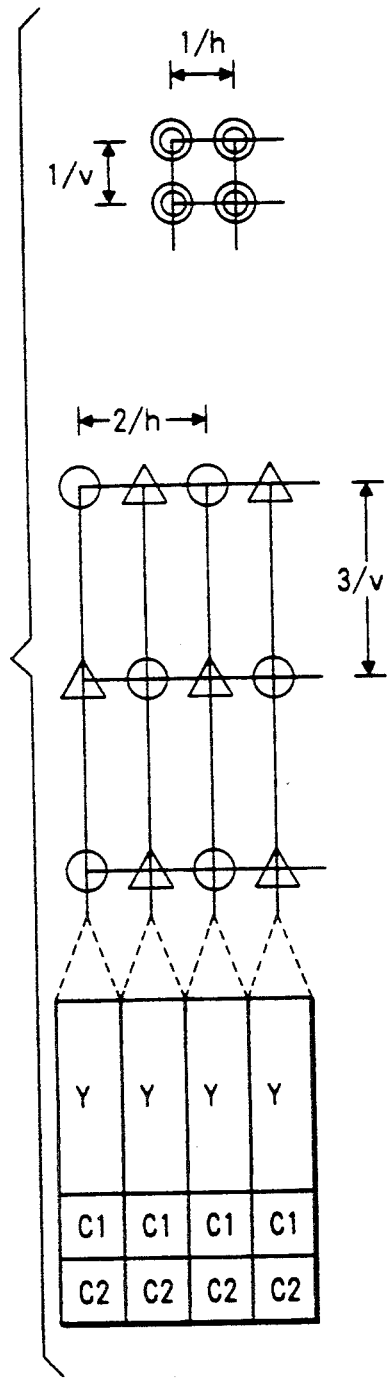
FIGS. 6A and 6B show a fifth example of sampling patterns.
Figure 6B:
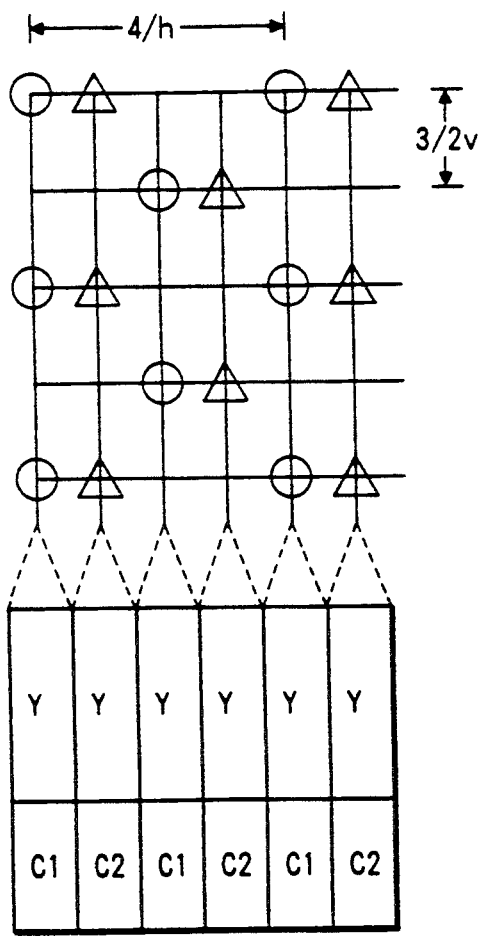

FIGS. 6A and 6B illustrate the fifth embodiment with the total sampling point number ratio of $Y : C1 : C2 = 6 : 1 : 1$. FIG. 6A illustrates an example wherein $N=2, H=h/2, V=v/3$, and offset-subsampling is used with the sampling point number ratio of $Y : C1 : C2 = 6 : 1 : 1$ for each vertical line. FIG. 6B illustrates an example wherein $N=4, H=h/4, V=2v/3$, and offset-subsampling is used with the sampling point number ratio of $Y : C1 : C2 = 6 : 2 : 0$ or $6 : 0 : 2$.

Figure 7:
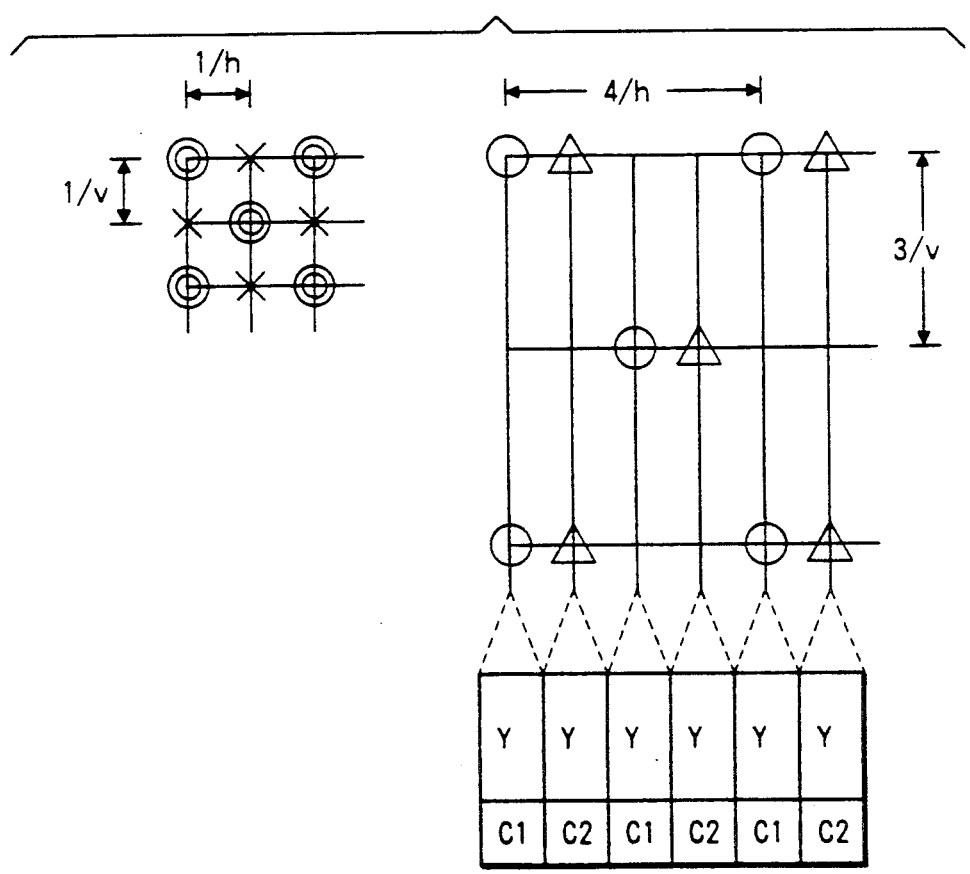
FIG. 7 shows a sixth example of sampling pattern.

FIG. 7 illustrates the sixth embodiment wherein the examples shown in FIGS. 6A and 6B ($Y : C1 : C2 = 6 : 1 : 1$) are subjected to sub-sampling for the data compression of signal Y and signal C. In this example, the total sampling point number ratio is $Y : C1 : C2 = 6/2 : ½ : ½$ the same as that of FIGS. 6A and 6B. Specifically, even after sub-sampling, the total sampling point ratio remains $Y : C1 : C2 = 6 : 1 : 1$. Therefore, for $N=2, H=h/4, V=v/3$, and offset-subsampling is used with the sampling point number ratio $Y : C1 : C2 = 6 : 2 : 0$ or 6:0:2. The data compression and the vertical direction Y-C line blocking of this invention can be achieved by sampling signal C at h x 2/4 in the horizontal direction and at v/3 in the vertical direction, and thereafter by using offset-subsampling to reduce it one half.

In the above embodiments, the sampling phases for C1 and C2 are depicted as different in the drawings in order to make the description correspond to the Y-C line block. The phases may be the same and only the vertical direction line blocking may be practiced according to the present invention. In the latter case, it is apparent that a vertical direction Y-C line block can be obtained with the constant ratio between signals Y and C.

Figure 8:
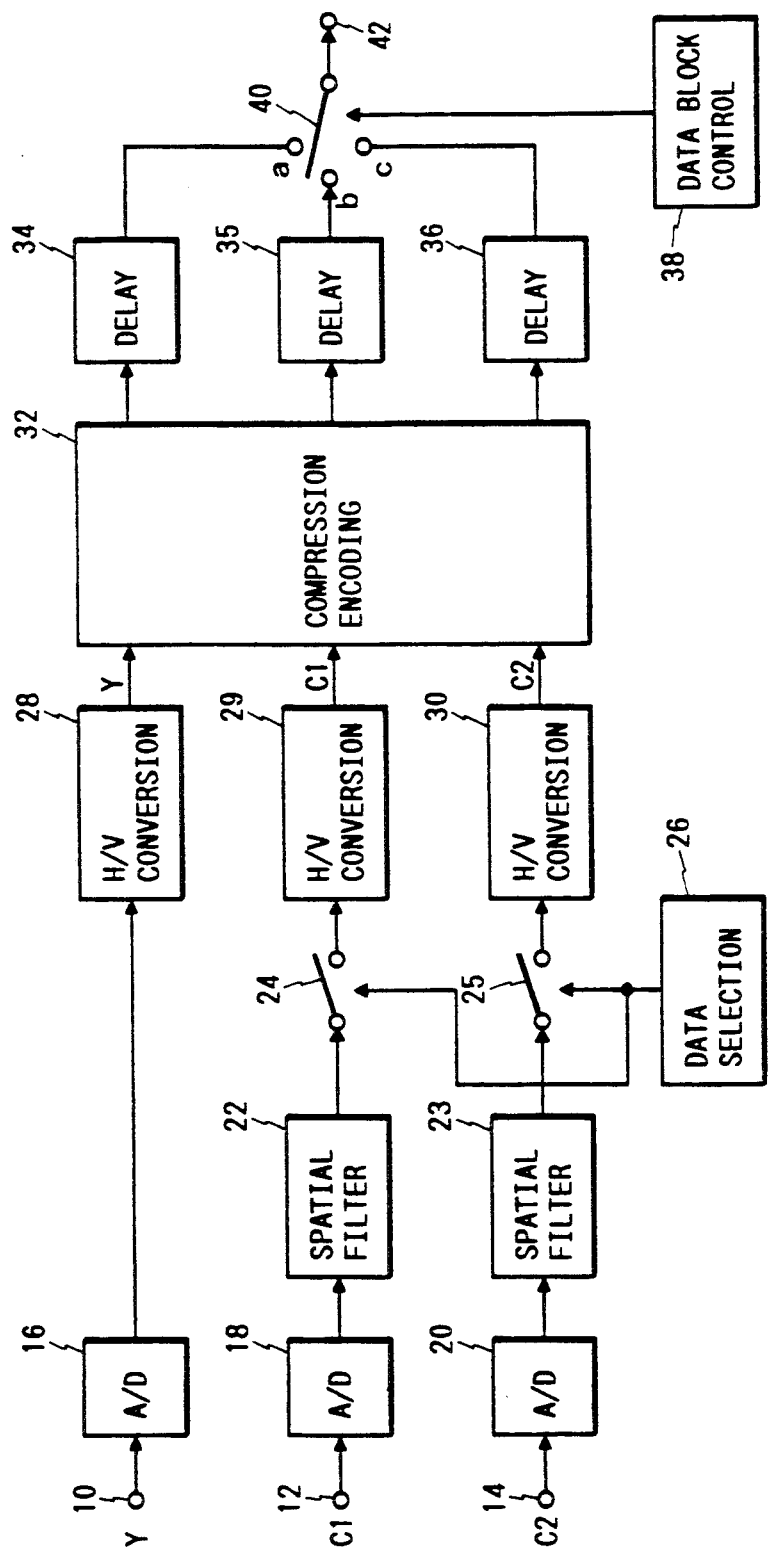
FIG. 8 is a block diagram showing the structure of a video signal encoding device applying the processing device of this invention.

FIG. 8 is a block diagram showing the structure of a compression encoding device for the vertical direction Y-C line blocking according to the present invention. It is assumed that sampling for the purpose of blocking is executed as described with FIG. 6A. Input terminals 10, 12, and 14 are inputted with signals Y, C1 and C2, respectively. A/D converters 16, 18 and 20 sample signals Y, C1 and C2 at the sampling rate h and convert them into digital signals to obtain the sampling pattern shown in FIG. 6A. Spatial filter circuits 22 and 23 are two-dimensional filters for band-eliminating signals C1 and C2 to prevent folded distortions which otherwise occur because of data thinning by ½ in the horizontal direction and by ⅓ in the vertical direction. Switches 24 and 25 are opened and closed by a data selector circuit 26 to derive pixels indicated by the circle symbol and the triangle symbol shown in FIG. 6A. At this time, the total sampling point number ratio becomes Y : C1 : C2 = 6 : 1 : 1.

Figure 12:
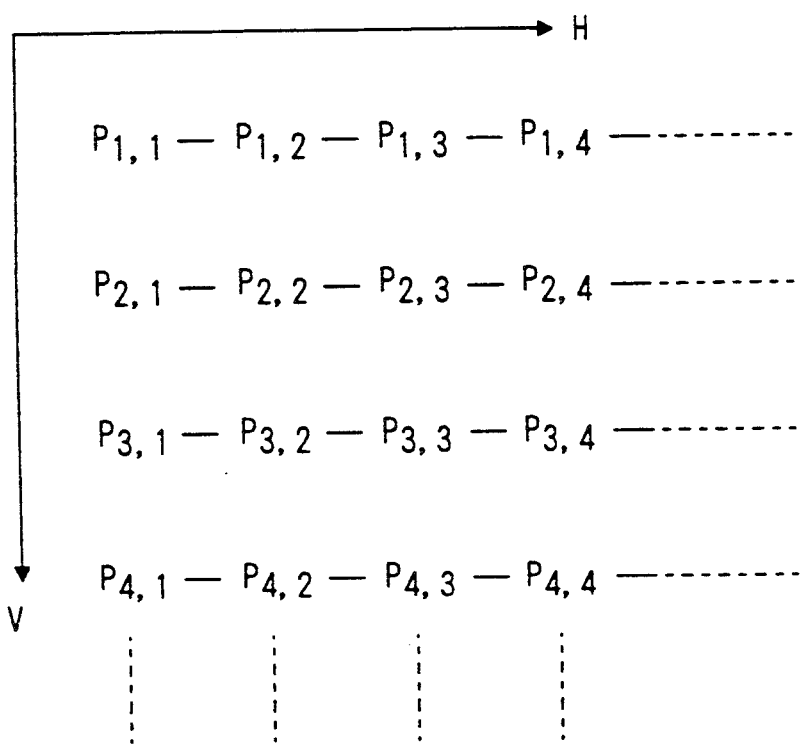
FIG. 12 shows the arrangement of pixels on a display screen.

H/V conversion circuits 28, 29 and 30 scanconvert video signals sequentially inputted in the horizontal direction into video signals sequentially scanned in the vertical direction. For example, as shown in FIG. 12, the conversion circuits 28, 29 and 30 convert pixel data sequentially input in the order p1,2, p1,3, p1,4, . . . , p2,1, p2,2, . . . into p1,1, p2,1, p3,1, p4,1, . . . , p1,2, p2,2, . . . in this order. A compression encoding circuit 32 causes the data scan-converted by the H/V conversion circuits 28, 29 and 30 to be subjected to predetermined compression encoding such as DPCM using correlation in the vertical direction. Three outputs from the compression encoding circuit are adaptatively delayed by delay circuits 34, 35 and 36 by the time necessary for Y-C blocking, and are selectively output from an output terminal 42 via a switch 40 which is switched by a data block control circuit 38, to thereby obtain a vertical direction Y-C line blocked data with the ratio of Y : C1 : C2 = 6 : 1 : 1.

Figure 9:
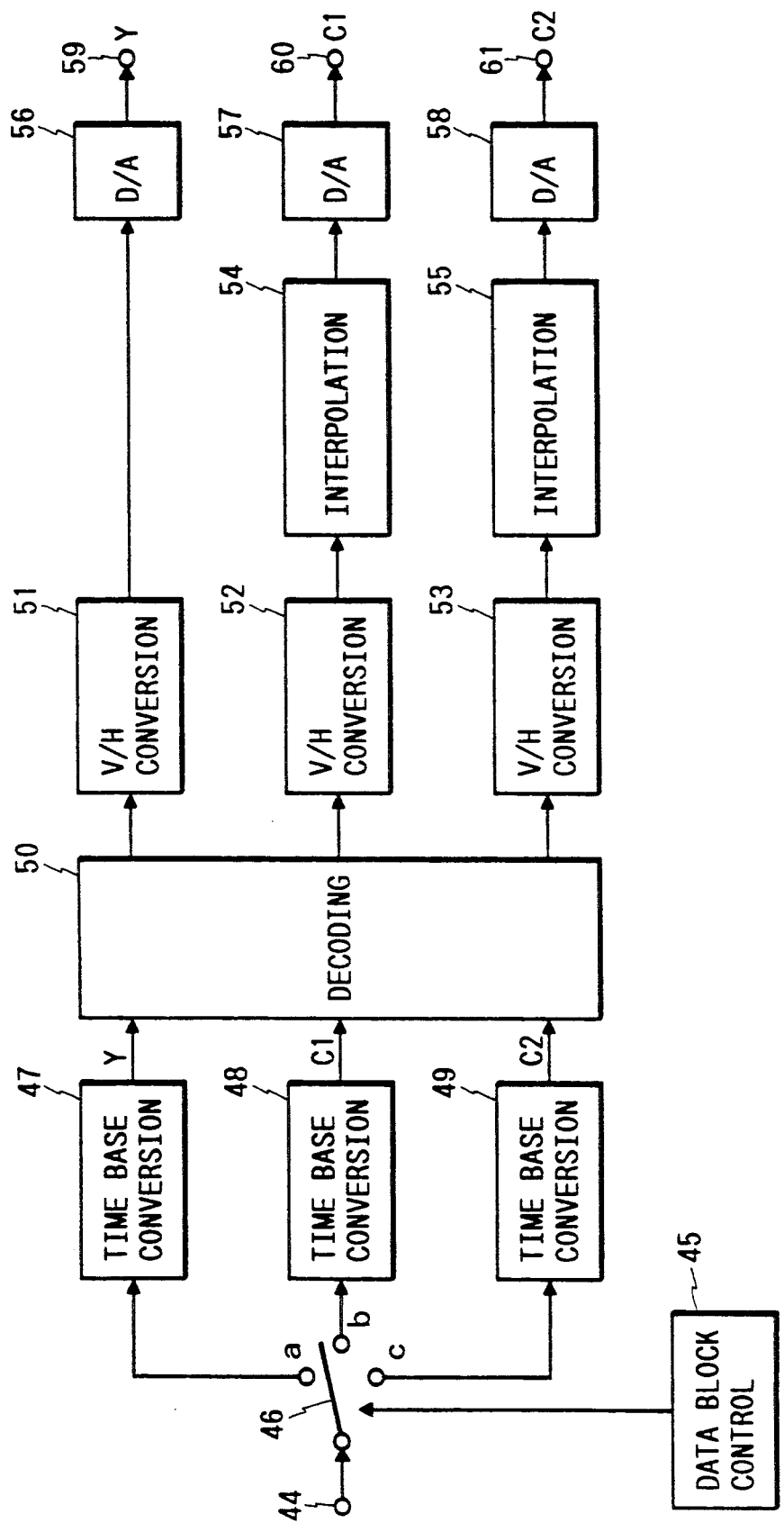
FIG. 9 is a block diagram showing the structure of a decoding device for the encoding device shown in FIG. 8.

FIG. 9 is a block diagram showing the structure of a device for reproducing an image signal from a compression encoded and vertical direction line blocked data. A signal from the output terminal 42 shown in FIG. 8 is input to a input terminal 44. Under control of a switch 46 which is operated by a data block control circuit 45, the input signal to the input terminal 44 is separated into signals Y, C1 and C2. The separated signals Y, C1 and C2 are input to a decoding circuit 50, via time base conversion circuits 47, 48 and 49 for canceling the time difference caused by the delay circuits 34, 35 and 36 shown in FIG. 8. The decoding circuit 50 decodes signals Y, C1 and C2, the decoding operation corresponding to the encoding operation by the compression encoding circuit 32 shown in FIG. 8.

Data decoded by the decoding circuit 50 is applied to V/H conversion circuits 51, 52 and 53 which convert vertically scanned signals from the decoding circuit 50 into horizontally scanned signals. Interpolation circuits 54 and 55 interpolate the interpolation points of C1 and C2 data thinned into the pattern as shown in FIG. 6A, to thereafter output signals having the original sampling rate. D/A converters 56, 57 and 58 convert digital output signals (Y) from the V/H conversion circuit 51, digital output signals (C1) from the interpolation circuit 54 and digital output signals (C2) from the interpolation circuit 55, respectively into analog signals Y, C1 and C2 which are output from output terminals 59, 60 and 61.

Figure 10:
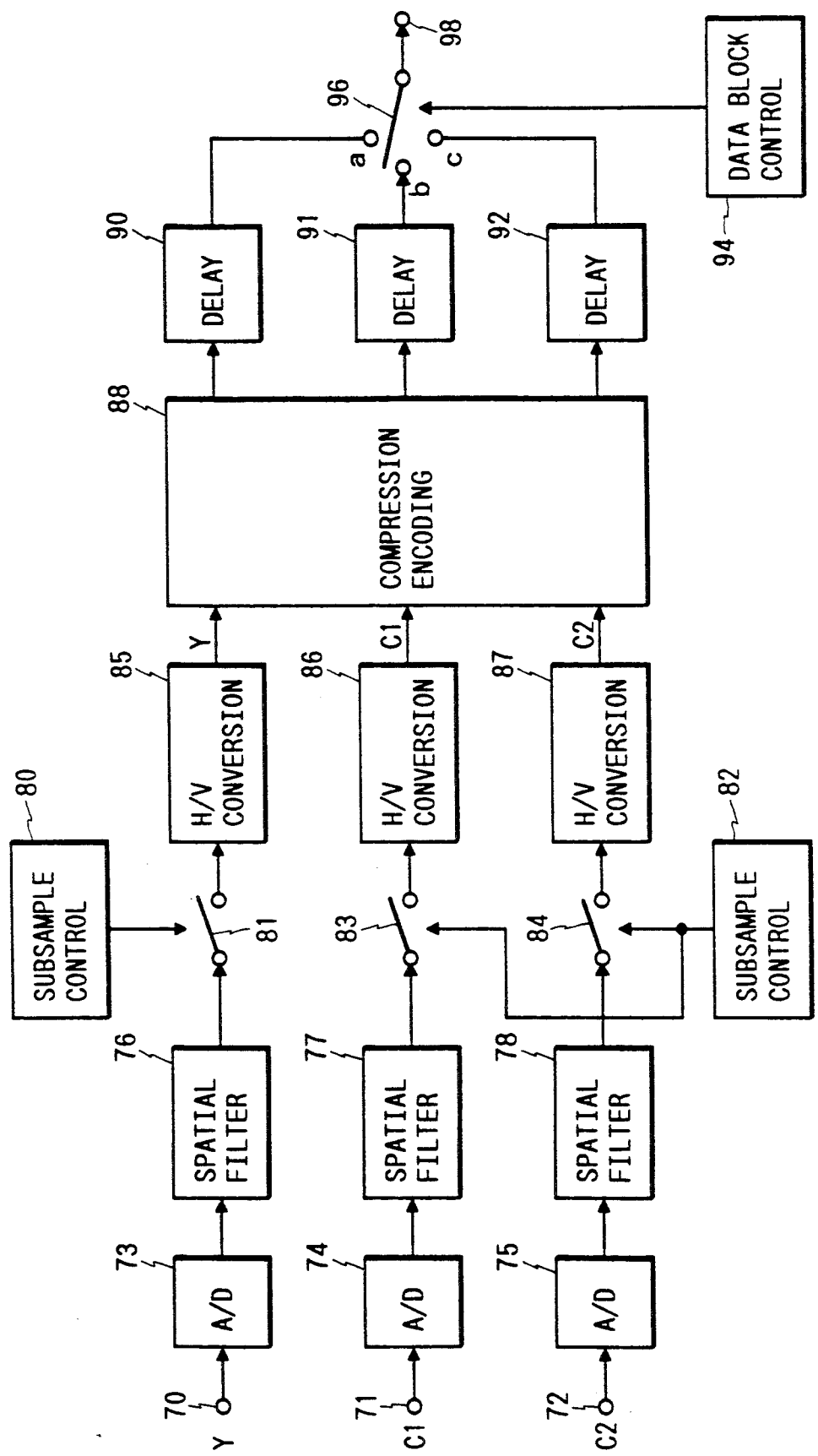
FIG. 10 is a block diagram showing the structure of another video signal encoding device applying the processing device of this invention.

Next, there will be described the case wherein signals Y and C are sampled at the same ratio, and at the same time, compressed through offset-subsampling, as in the case of blocking described with FIG. 7. FIG. 10 is a block diagram showing the structure of an encoding device to be used for such a case. Input terminals 70, 71 and 72 are input with signals Y, C1 and C2, respectively, which are sampled by A/D converters 73, 74 and 75 at the sampling rates h, h/2 and h/2 and converted into digital signals. At this time, the total sampling point number ratio becomes Y : C1 : C2 = 2 : 1 : 1. Spatial filter circuits 76, 77 and 78 execute spatial frequency band-elimination to prevent folded distortions which otherwise occur because of sampling. The filter circuits also filter signals C1 and C2 for the sampling pattern shown in FIG. 7.

An output (Y) from the spatial filter 76 is subsampled for reducing data amount (e.g., pattern indicated at a double circle symbol in FIG. 7), by means of a switch 81 which is controlled by a subsample control circuit 80. The outputs (C1, C2) from the spatial filters 77 and 78 are subsampled for reducing the data amount, and also subsampled into a sample pattern for Y-C blocking indicated at a circle symbol and a triangle symbol in FIG. 7, by means of switches 83 and 84 which are controlled by a subsample control circuit 82.

The operation after subsampling by the switches 81, 83 and 84 is similar to that described with FIG. 8. Namely, the outputs from the switches 81, 83 and 84 are converted from horizontally scanned signals to vertically scanned signals by H/V conversion circuits 85, 86 and 87, and compression encoded by a compression encoding circuit 88. The data encoded by the compression encoding circuit 88 is subjected to time adjustment for vertical direction Y-C line blocking by delay circuits 90, 91 and 92, and selectively outputted from an output terminal 98 via switch 96 which is switched by a data block control circuit 94, to thereby obtain a vertical direction Y-C line blocked data.

Figure 11:
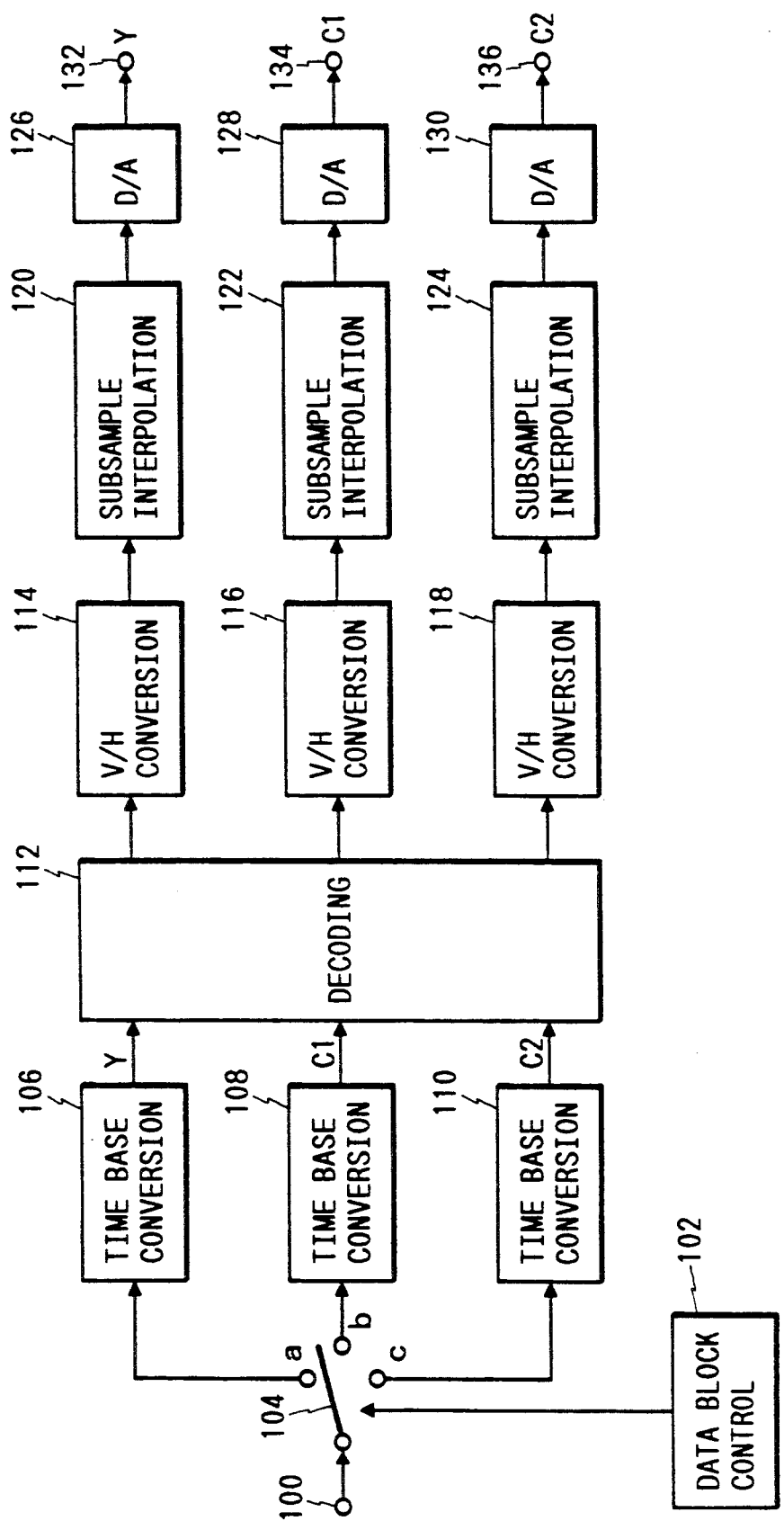
FIG. 11 is a block diagram showing the structure of a decoding device for the encoding device shown in FIG. 10.

FIG. 11 is a block diagram showing the structure of a decoding device in correspondence with the encoding device shown in FIG. 10. A signal from the output terminal 98 shown in FIG. 10 is input to an input terminal 100. Under control of a switch 104 which is operated by a data block control circuit 102, the input signal to the input terminal 100 is separated into signals Y, C1 and C2. The separated signals Y, C1 and C2 are input to a decoding circuit 112, via time base conversion circuits 106, 108 and 110 for the time base conversion. The signals Y, C1 and C2 decoded by the decoding circuit 112 are converted from vertically scanned signals into horizontally scanned signals by V/H conversion circuits 114, 116 and 118. The operation so far is the same as described with FIG. 9.

The outputs from the V/H conversion circuits 114, 116 and 118 are applied to subsample interpolation circuits 120, 122 and 124 to interpolate the subsample interpolated points. The subsample interpolation circuits 122 and 124 interpolate at the same time the sample pattern indicated by a circle symbol and a triangle symbol shown in FIG. 6. That is, the circuits 122 and 124 also have the function of the interpolation circuits 54 and 55 shown in FIG. 10.

D/A converters 126, 128 and 130 convert digital output signals from the subsample interpolation circuits 120, 122 and 124 into analog signals at the sampling rates of h, h/2 and h/2, so that the analog signals Y, C1 and C2 are obtained at output terminals 132, 134 and 136.

As above, if the data compression by subsampling is additionally used, conversion of signal C into a sampling pattern necessary for vertical direction Y-C line blocking can be executed at the same time while sampling signal C, resulting in an advantage of a compact and simple circuit.

As readily understood from the foregoing description of this invention, it is possible to make constant the sampling point ratio between signals Y and C for each vertical line, and realize blocking on the vertical line unit basis. Therefore, it becomes easy to digitally process a color image signal using correlation in the vertical direction.

What is claimed is:

1. A video signal processing device, comprising:
(a) sampling means for sampling a luminance signal and two types of color difference signals respectively contained in a video signal, said sampling means being constructed such that,
the ratio of a total sampling number of said luminance signal to a total sampling number of each of said two types of color difference signals is m : n (where m and n are positive integers),
the ratio of a sampling number of said luminance signal to a sampling number of each of said two types of color difference signals is N : 1 (where N is an even number equal to 2 or more), for each line extending in a first direction which is the scan direction of said video signal,
the ratio of a total sampling frequency of said luminance signal to a total sampling frequency of each of said two types of color difference signals is 1 : (nN/m), for a second direction intersecting with said first direction, and
the ratio of a sampling number of said luminance signal to sampling numbers of said two types of color difference signals is one of (m/n) : 1 : 1, (m/n) : 2 : 0, and (m/n) : 0 : 2, for each line extending in said second direction; and (b) coding means for coding samples of said luminance signal and said two types of color difference signals sampled by said sampling means.

2. A device according to claim 1, wherein the coding by said coding means is executed on a block unit basis, said block containing one line extending in said second direction, or containing a division of lines extending in said second direction.

3. A device according to claim 1, wherein said coding means further comprises compression coding means for compressing information amount by using correlation of said video signal in said second direction.

4. A device according to claim 1, wherein said sampling means line-offset-samples each of said two type of color difference signals.

5. A device according to claim 1, wherein one frame of said video signal includes two fields, and said sampling means field-offset-samples each of said two types of color difference signals.

6. A video signal processing device, comprising:
(a) sampling means for sampling a luminance signal and two types of color difference signals respectively contained in a video signal, said sampling means being constructed such that,
the ratio of a total sampling number of said luminance signal to a total sampling number of each of said two types of color difference signals is m : n (where m and n are positive integers),
the ratio of a total sampling frequency of said luminance signal to a total sampling frequency of said two types of color difference signals is 1 : 1, for a first direction which is the scan direction of said video signal, and
the ratio of a sampling number of said luminance signal to a sampling numbers of said two types of color difference signals is one of (m/n) : 1 : 1, (m/n) : 2 : 0, and (m/n) : 0 : 2, for each line extending in a second direction intersecting said first direction; and (b) coding means for coding samples of said luminance signal and said two types of color difference signals sampled by said sampling means.

7. A video signal processing device, comprising:
a) sampling means for sampling a luminance signal and two types of color difference signals respectively contained in a video signal, said sampling means being constructed such that
the ratio of a total sampling number of said luminance signal to a total sampling number of each of said two types of color difference signals is 2 : 1,
the ratio of a total sampling frequency of said luminance signal to a total sampling frequency of said two types of color difference signals is 1 : 1, for a horizontal scan direction of said video signal, and
the ratio of a sampling number of said luminance signal to a sampling numbers of said two types of color difference signals is one of 2 : 1 : 1, 2 : 2 : 0, and 2 : 0 : 2, for each vertical line extending in the vertical direction of said video signal; and
(b) coding means for coding samples of said luminance signal and said two types of color difference sampled by said sampling means.

8. A video signal processing device according to claim 7, wherein said sampling means is constructed such that
the ratio of a sampling number of said luminance signal to a sampling number of each of said two types of color difference signals is 2 : 1, for each line extending in said horizontal scan direction, and
the ratio of a total sampling frequency of said luminance signal to a total sampling frequency of each of said two types of color difference signals is 1 : 1, for said vertical direction.

9. A video signal processing device, comprising:
(a) sampling means for sampling a luminance signal and two types of color difference signals respectively contained in a video signal, said sampling means being constructed such that,
the ratio of a total sampling number of said luminance signal to a total sampling number of each of said two types of color difference signals is 4 : 1, the ratio of a total sampling frequency of said luminance signal to a total sampling frequency of said two types of color difference signals is 1 : 1, for a horizontal scan direction of said video signal, and the ratio of a sampling number of said luminance signal to a sampling numbers of said two types of color difference signals is one of 4 : 1 : 1, 4 : 2 : 0, and 4 : 0 : 2, for each vertical line extending in the vertical direction of said video signal; and (b) coding means for coding samples of said luminance signal and said two types of color difference signals sampled by said sampling means.

10. A video signal processing device according to claim 9, wherein said sampling means is constructed such that the ratio of a sampling number of said luminance signal to a sampling number of each of said two types of color difference signals is 4 : 1, for each line extending in said horizontal scan direction, and the ratio of a total sampling frequency of said luminance signal to a total sampling frequency of each of said two types of color difference signals is 1 : 1, for said vertical direction.

11. A video signal processing device according to claim 9, wherein said sampling means is constructed such that the ratio of a sampling number of said luminance signal to a sampling number of each of said two types of color difference signals is 2 : 1, for each line extending in said horizontal scan direction, and the ratio of a total sampling frequency of said luminance signal to a total sampling frequency of each of said two types of color difference signals is 2 : 1, for said vertical direction.

12. A video signal processing device, comprising:

(a) sampling means for sampling a luminance signal and two types of color difference signals respectively contained in a video signal, said sampling means being constructed such that, the ratio of a total sampling number of said luminance signal to a total sampling number of each of said two types of color difference signals is 8 : 1, the ratio of a total sampling frequency of said luminance signal to a total sampling frequency of said two types of color difference signals is 1 : 1, for a horizontal scan direction of said video signal, and the ratio of a sampling number of said luminance signal to a sampling numbers of said two types of color difference signals is one of 8 : 1 : 1, 8 : 2 : 0, and 8 : 0 : 2, for each vertical line extending in the vertical direction of said video signal; and (b) coding means for coding samples of said luminance signal and said two types of color difference signals sampled by said sampling means.

13. A video signal processing device according to claim 12, wherein said sampling means is constructed such that the ratio of a sampling number of said luminance signal to a sampling number of each of said two types of color difference signals is 4 : 1, for each line extending in said horizontal scan direction, and the ratio of a total sampling frequency of said luminance signal to a total sampling frequency of each of said two types of color difference signals is 2 : 1, for said vertical direction.

14. A video signal processing device, comprising:

(a) sampling means for sampling a luminance signal and two types of color difference signals respectively contained in a video signal, said sampling means being constructed such that, the ratio of a total sampling number of said luminance signal to a total sampling number of each of said two types of color difference signals is 3 : 1, the ratio of a total sampling frequency of said luminance signal to a total sampling frequency of said two types of color difference signals is 1 : 1, for a horizontal scan direction of said video signal, and the ratio of a sampling number of said luminance signal to a sampling numbers of said two types of color difference signals is one of 3 : 1 : 1, 3 : 2 : 0, and 3 : 0 : 2, for each vertical line extending in the vertical direction of said video signal; and (b) coding means for coding samples of said luminance signal and said two types of color difference signals sampled by said sampling means.

15. A video signal processing device according to claim 14, wherein said sampling means is constructed such that the ratio of a sampling number of said luminance signal to a sampling number of each of said two types of color difference signals is 2 : 1, for each line extending in said horizontal scan direction, and the ratio of a total sampling frequency of said luminance signal to a total sampling frequency of each of said two types of color difference signals is 3/2 : 1, for said vertical direction.

16. A video signal processing device, comprising:

(a) sampling means for sampling a luminance signal and two types of color difference signals respectively contained in a video signal, said sampling means being constructed such that, the ratio of a total sampling number of said luminance signal to a total sampling number of each of said two types of color difference signals is 6 : 1, the ratio of a total sampling frequency of said luminance signal to a total sampling frequency of said two types of color difference signals is 1 : 1, for a horizontal scan direction of said video signal, and the ratio of a sampling number of said luminance signal to a sampling numbers of said two types of color difference signals is one of 6 : 1 : 1, 6 : 2 : 0, and 6 : 0 : 2, for each vertical line extending in the vertical direction of said video signal; and (b) coding means for coding samples of said luminance signal and said two types of color difference signals sampled by said sampling means.

17. A video signal processing device according to claim 16, wherein said sampling means is constructed such that the ratio of a sampling number of said luminance signal to a sampling number of each of said two types of color difference signals is 4 : 1, for each line extending in said horizontal scan direction, and the ratio of a total sampling frequency of said luminance signal to a total sampling frequency of each of said two types of color difference signals is 3/2 : 1, for said vertical direction.

18. A video signal processing device according to claim 16, wherein said sampling means is constructed such that the ratio of a sampling number of said luminance signal to a sampling number of each of said two types of color difference signals is 2 : 1, for each line extending in said horizontal scan direction, and the ratio of a total sampling frequency of said luminance signal to a total sampling frequency of each of said two types of color difference signals is 3 : 1, for said vertical direction.

19. A video signal processing device, comprising:
(a) sampling means for sampling a luminance signal and two types of color difference signals respectively contained in a video signal, said sampling means being constructed such that,
the ratio of a total sampling number of said luminance signal to a total sampling number of each of said two types of color difference signals is m : n (where m and n are positive integers); and
(b) coding means for coding samples of said luminance signal and said two types of color difference signals sampled by said sampling means, the coding by said coding means is executed on a block unit basis, said block containing one line extending in a second direction intersecting a first direction which is the scan direction of said video signal, or containing a division of lines extending in said second direction, wherein
the ratio of a sampling number of said luminance signal to a sampling numbers of said two types of color difference signals is one of $(m/n) : 1 : 1$, $(m/n) : 2 : 0$, and $(m/n) : 0 : 2$, for each of said blocks.

20. A device according to claim 19, wherein said coding means further comprises compression coding means for compressing information amount by using correlation of said video signal in said second direction.

* * * * *

UNITED STATES PATENT AND TRADEMARK OFFICE
CERTIFICATE OF CORRECTION

PATENT NO. : 5,136,379
DATED : August 4, 1992
INVENTOR(S) : YOSHIKI ISHII

It is certified that error appears in the above-identified patent and that said Letters Patent is hereby corrected as shown below:

On the Title Page, Item [57] ABSTRACT

Line 4, "being" should be deleted.
   Line 5, "(1)" should be deleted.
   Line 9, "(2)" should be deleted.
   Line 14, "(3)" should be deleted.
   Line 18, "(4)" should be deleted.
   Line 26, "signals" should be deleted.

COLUMN 3

Line 45, "integers, specifically)" should read
          --integers), specifically--.
   Line 51, "(n" should read --(N--.

COLUMN 5

Line 34, "scanconvert" should read --scan-convert--.

COLUMN 8

Line 2, "type" should read --types--.
   Line 26, "direction;" should read --direction; and--.
   Line 27, "and" should be deleted.
   Line 43, "a" should be deleted.

COLUMN 9

Line 6, "a" should be deleted.
   Line 48, "a" should be deleted.

UNITED STATES PATENT AND TRADEMARK OFFICE
CERTIFICATE OF CORRECTION

PATENT NO. : 5,136,379
DATED : August 4, 1992
INVENTOR(S) : YOSHIKI ISHII

It is certified that error appears in the above-identified patent and that said Letters Patent is hereby corrected as shown below:

COLUMN 10

Line 11, "a" should be deleted.
    Line 42, "a" should be deleted.

COLUMN 12

Line 7, "a" should be deleted.

Signed and Sealed this

Fifth Day of October, 1993

Attest:

BRUCE LEHMAN

Attesting Officer     Commissioner of Patents and Trademarks